June 28, 1949.  A. K. HINCHMAN  2,474,673
NOZZLE AND TIP FOR BURNING AND WELDING TORCHES
Filed March 31, 1944

Inventor
Alva K. Hinchman,
By W. W. Williamson
Attorney

Patented June 28, 1949

2,474,673

UNITED STATES PATENT OFFICE 2,474,673

NOZZLE AND TIP FOR BURNING AND WELDING TORCHES

Alva K. Hinchman, Bryn Mawr, Pa.

Application March 31, 1944, Serial No. 528,987

3 Claims. (Cl. 158—27.4)

My invention relates to new and useful improvements in nozzles and tips for burning and welding torches, and has for one of its objects to provide a construction that will facilitate the manufacture of such appliances.

Another object of the invention is to provide a construction of nozzle and tip of the kind mentioned that will produce a flame of very high temperature.

Another object of this invention is to provide a sectional nozzle in which each section may be drilled separately so that only short individual drilling operations are necessary thus reducing the likelihood of tool breakage and resulting in a reduction of manufacturing costs.

Another object of the invention is to provide an unique means for regulating the outlet of the nozzle bore to adapt the size thereof to varying pressures, volume and the different kinds of gases used.

Another object of the invention is to provide collet regulators of novel construction for the bores of burning and welding torches, said regulators being of two forms so that they may be moved towards the closed position by either a pulling or pushing movement.

A further object of the present invention is to provide removable and interchangeable tips for the nozzles of burning and welding torches which can be discharged when damaged and replaced by new ones thereby eliminating the necessity of throwing away the entire nozzle.

With the above and other objects in view, this invention consists of the details of construction and combination of elements hereinafter set forth and then designated by the claims.

In order that those skilled in the art to which this invention appertains may understand how to make and use the same I will describe its construction in detail, referring by numerals to the accompanying drawings forming a part hereof, in which.

Figure 1:
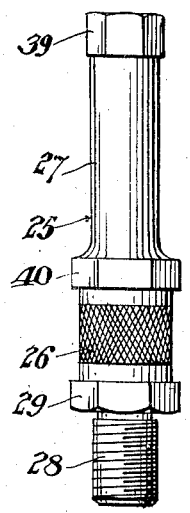
Fig. 1 is a side elevation of a sectional nozzle and detachable tip.
Figure 2:
Fig. 2 is an enlarged upper or outer end view thereof.
Figure 3:
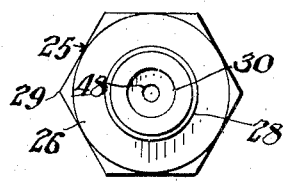
Fig. 3 is an enlarged view of the lower or inner end of same.

In carrying out my invention as herein embodied, reference first being had to Figs. 1 to 17, inclusive, 25 represents a two-piece or sectional nozzle for burning and welding torches, comprising a body or inner member or section 26 and a head or outer member or section 27, connected together by a threaded joint. This construction makes it easy to form the various types of bores, passageways, openings and recesses with short boring operations and likewise makes it easy to reach certain locations for countersinking, finishing and the like, thus facilitating the manufacture and reducing the cost thereof.

As illustrated in Figs. 1 to 7, the nozzle body 26 is provided with a reduced externally threaded portion or shank 28 adapted to be screwed into a torch head, and a non-circular portion 29 whereby the nozzle may be rotated for screwing it into the torch head or held stationary for other purposes. A bore 30 is formed in the body section from end to end, including the shank, and the inner portion of said bore is preferably enlarged or counterbored, as at 31, and terminates in a conical seat 32.

The inner end of the body has a reduced externally threaded neck 33 for projection into the threaded socket 34 at the inner end of the nozzle head section 27 for joining the two sections together, and provide a shoulder 33a. The formation of the socket 34 produces a flat seat or shoulder 35. A bore 36 is formed in the head section 27 from end to end and aligns with the bore 30 of the body section 26 when the two sections are joined, and said bore 36 terminates in an inverted cone shaped or diverging internal seat 37.

The outer end of said head section is externally threaded at 38 to receive any one of a number of different demountable tips, one of which is shown in place and designated 39, and the inner end of said head section 27 has a non-circular portion 40 for the reception of a wrench.

The tip 39 has a non-circular exterior configuration whereby it may be readily rotated and is interiorly threaded for mounting and adjustment on the threaded end 38 of the head section. This particular tip has a small straight hole 41 in the center of its top or end wall for use with acetylene.

Figure 4:
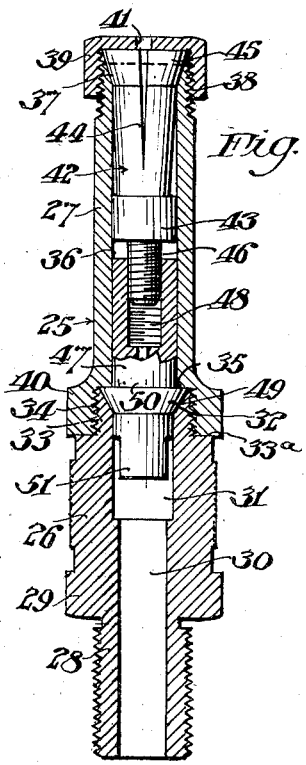
Fig. 4 is also an enlarged longitudinal sectional elevation of Fig. 1.
Figure 5:
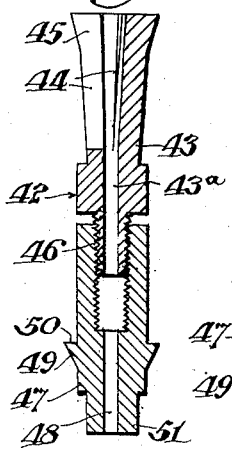
Fig. 5 is a longitudinal sectional view of the regulator of Fig. 4.
Figure 6:
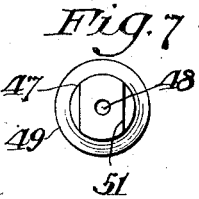
Fig. 6 is an outer or upper end view thereof.
Figure 7:
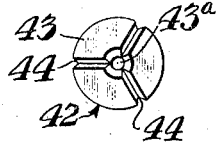
Fig. 7 is an inner or lower end view of the same.

A regulator 42, Figs. 4 and 5, is mounted in the bore 36 of the nozzle head 27, Fig. 4, and said regulator 42 includes a sleeve 43 having its upper or outer portion slit longitudinally as at 44 and provided with a flared tapered end 45 to fit the seat 37. The segments produced by the slits are contracted as the sleeve is pulled inward and due to an inherent resiliency they will spring apart or expand as the sleeve is moved outward. The sleeve bore 43a runs from end to end and through the exteriorly threaded reduced stem 46.

On said stem 46 is screwed the adjusting member 47 having a bore 48 running through it from end to end and of two different diameters, the larger diameter having a thread for engagement with the threaded stem 46. According to the showing in Fig. 5, a downwardly tapering collar 49 is formed on the adjusting member near its outer or lower end, providing a conical surface for coaction with the seat 32 and a shoulder 50 to engage the shoulder 35. The extreme lower or outer end of said adjusting member has a non-circular portion 51 for the reception of a tool by which the adjusting member may be rotated.

From the foregoing it will be obvious that by separating the head section 27 from the body section 26 and then turning the adjusting member 47 in the proper direction the sleeve 43 will be pulled inward or allowed to move outward and thus regulate the size of the bore 43a. After the sleeve 43 has been adjusted, the tip 38, or another somewhat similar one, is screwed down until its end wall engages the outer end of the sleeve.

The provision of demountable and interchangeable tips besides enabling the operator to change from the use of one gas to another by merely substituting tips also makes it possible to manufacture the nozzle from one metal, such as brass, and utilize another metal, such as copper, for the tips.

Of course I do not wish to be limited to the exact details of construction herein shown and described as these may be varied within the scope of the appended claims without departing from the spirit of my invention.

Having described my invention what I claim as new and useful is:

1. A nozzle for gas burning apparatus comprising a head section provided with a bore therethrough from an outer end to an inner end thereof, an outwardly flared tapered interior seat at the outer end of said head section, means forming a socket at the inner end of said head section and larger than the bore, a shoulder within said socket, a tubular sleeve having a tapered outer end to fit the tapered seat and provided with a plurality of slits crosswise of said sleeve and extending longitudinally thereof for a predetermined distance from said outer end to produce segments, hollow means having threaded engagement with the sleeve and engaging the shoulder to pull said sleeve inwardly when the hollow means is rotated in one direction, and a body section having a bore therethrough from end to end thereof and detachably connected to the inner end of the head section.

2. A nozzle for gas burning apparatus comprising a head section provided with a bore therethrough from an outer end to an inner end thereof, an outwardly flared tapered interior seat at the outer end of said head section, said outer end of the head section being externally threaded, means forming a socket at the inner end of said head section and larger than the bore, a shoulder within said socket, a body section having a bore therethrough from end to end thereof, a neck carried by the body section for engagement with the socket end of the head section to detachably connect said sections, a conical seat on the interior of the outer end of the neck, a sleeve having a tapered outer end to fit the tapered seat and provided with a plurality of slits crosswise of said sleeve and extending longitudinally thereof for a predetermined distance from said outer end to produce segments, a hollow adjusting member having threaded engagement with the sleeve, a tapered collar on said adjusting member to fit the tapered seat in the neck of the body section and producing a shoulder to engage the shoulder formed in the socket so that when said adjusting member is rotated in one direction the sleeve will be pulled inwardly, and an apertured tip removably mounted on the threaded outer end of the head section.

3. In a nozzle for gas burning apparatus including a body section and a head section detachably connected together and each having a bore therethrough from an outer end to an inner end thereof, said head section having an outwardly flared tapered interior seat at the outer end thereof, a regulator within said nozzle and comprising a sleeve having an outwardly flared outer end to engage the seat and provided with a plurality of slits crosswise of said sleeve and extending longitudinally thereof a predetermined distance from said outer end to produce several segments having an inherent resiliency to normally separate them, and a hollow adjusting member threadedly connected to the sleeve and held against longitudinal movement in the nozzle to pull the sleeve inwardly for drawing the segments together as they move along the seat.

ALVA K. HINCHMAN.

REFERENCES CITED

The following references are of record in the file of this patent:

UNITED STATES PATENTS

| Number | Name | Date |
|---|---|---|
| 616,453 | Cattell | Dec. 27, 1898 |
| 935,684 | Peterson et al. | Oct. 5, 1909 |
| 969,875 | Johnson | Sept. 13, 1910 |
| 981,342 | Williams | Jan. 10, 1911 |
| 1,050,756 | Wight | Jan. 14, 1913 |
| 1,185,585 | Bower | May 30, 1916 |
| 1,407,098 | Stichler | Feb. 21, 1922 |
| 1,597,554 | Thorpe et al. | Aug. 24, 1926 |
| 1,808,968 | Plumley | June 9, 1931 |
| 1,901,415 | Schneider | Mar. 14, 1933 |
| 1,955,120 | Fausek et al. | Apr. 17, 1934 |
| 2,016,866 | Lurie | Oct. 8, 1935 |
| 2,046,920 | Meacham | July 7, 1936 |
| 2,207,655 | Cain | July 9, 1940 |
| 2,238,360 | Forster | Apr. 15, 1941 |
| 2,266,834 | Walker et al. | Dec. 23, 1941 |
| 2,376,413 | Babcock | May 22, 1945 |

FOREIGN PATENTS

| Number | Country | Date |
|---|---|---|
| 297,289 | Italy | June 8, 1932 |
| 344,531 | France | Sept. 7, 1904 |
| 425,727 | Great Britain | Mar. 20, 1935 |